(12) United States Patent
Bune

(10) Patent No.: US 7,607,054 B2
(45) Date of Patent: Oct. 20, 2009

(54) METHOD OF IMPROVING THE INTERFACE EFFICIENCY IN A COMMUNICATIONS NETWORK

(75) Inventor: Paul A. M. Bune, Kornwestheim (DE)

(73) Assignee: Evolium S.A.S., Paris (FR)

( * ) Notice: Subject to any disclaimer, the term of this patent is extended or adjusted under 35 U.S.C. 154(b) by 1134 days.

(21) Appl. No.: 10/863,233

(22) Filed: Jun. 9, 2004

(65) Prior Publication Data

US 2005/0005196 A1    Jan. 6, 2005

(30) Foreign Application Priority Data

Jun. 13, 2003    (EP) ................... 03360071

(51) Int. Cl.
*G01R 31/28* (2006.01)
*G01R 31/08* (2006.01)
*G06F 11/00* (2006.01)

(52) U.S. Cl. .................. 714/712; 714/701; 370/242
(58) Field of Classification Search ............ None
See application file for complete search history.

(56) References Cited

U.S. PATENT DOCUMENTS 6,944,802 B2 * 9/2005 Park et al. ............... 714/701

7,145,889 B1 * 12/2006 Zhang et al. ............... 370/329
7,162,411 B2 *  1/2007 Agarwala et al. ........... 703/28
2001/0004355 A1 6/2001 Galyas et al.
2002/0026614 A1 2/2002 Park et al.
2005/0272366 A1 12/2005 Eichinger et al.

FOREIGN PATENT DOCUMENTS

EP         1 191 750 A1     3/2002
WO    WO 20041002082 A1   12/2003

OTHER PUBLICATIONS

ETSI-3GPP: "TS 125.247 v3.3.0—UMTS; UTRAN Iub/Iur Interface User Plane Protocol for DCH Data Streams (3G TS25.427 Version 3.3.0 Release 1999)" ETSI TS 125 427 V3.3.0, Jun. 2000, XP002182248.

* cited by examiner

*Primary Examiner*—Christine T Tu
(74) *Attorney, Agent, or Firm*—Fay Sharpe LLP

(57) ABSTRACT

In a method for improving the interface efficiency between two network nodes (2, 3, 4) in a communications network (1) the data blocks to be transmitted over the interface are checked for corruption or likely corruption prior to transmission and only uncorrupted or likely uncorrupted data blocks are incorporated in the data frame and transmitted over the interface.

20 Claims, 3 Drawing Sheets

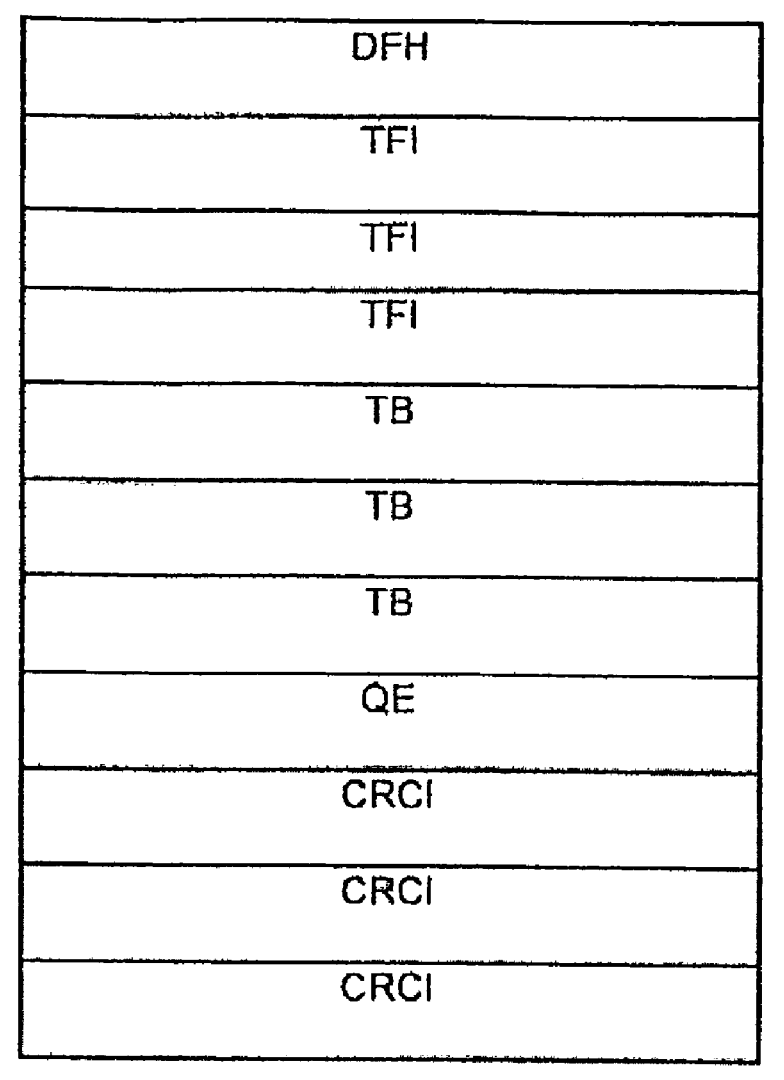

| DFH |
|---|
| TFI |
| TFI |
| TFI |
| TB |
| TB |
| TB |
| QE |
| CRCI |
| CRCI |
| CRCI |

Fig. 4

METHOD OF IMPROVING THE INTERFACE EFFICIENCY IN A COMMUNICATIONS NETWORK

TECHNICAL FIELD

The invention relates to a method of transmitting a data frame via an interface between two network nodes, the data frame comprising a data frame header and at least one data block, wherein before transmission the at least one data block is checked for corruption or likely corruption. The invention further relates to a communications network and a network node in which the method is implemented and to a data frame format of the data frame.

The invention is based on a priority application, EP 03360071.9, which is hereby incorporated by reference.

Inside each base station, e.g. a global system for mobile communication (GSM) base transceiver station (BTS) or a universal mobile communications system (UMTS) base station (Node B), the uplink analogue signals as picked up by the different antennas are digitally sampled, demodulated (which may involve despreading in a code division multiplex access (CDMA) system) and channel-decoded.

BACKGROUND OF THE INVENTION

In state of the art UMTS, after channel decoding, the data are collected as (hard) bits into so-called transport blocks (TB). The contents of these transport blocks are compared with the attached cyclic redundancy check (CRC) fields (which can have a size between 8 and 24 bits) in order to check whether the transport block is corrupted or not. Thereupon, the CRC field is deleted, and the information whether the CRC was "good" or "bad" is contained in a one-bit indicator called CRCI. Then, the transport blocks belonging to one channel's transmission timing interval (TTI) or to the TTI of one set of coordinated channels are collected into an uplink frame protocol (FP) data frame together with their corresponding CRCIs, regardless whether the data is corrupted or not.

In each FP frame, for each transport channel, the radio network controller (RNC) receives a transport format indicator (TFI), which indicates the actual number of transport blocks in the transport channel and their size (all transport blocks in a transport channel are of equal size). The TFI may change from one FP frame to the next frame containing data of the same transport channel.

Via fixed links, e.g. between a base station and an RNC, the complete uplink FP data frames are sent to the RNC. In UMTS (or any other CDMA system), one connection may involve more than one Node B, in which case the connection is indicated to be in "soft handover" state. At the RNC, for a connection being in "soft handover" state, uplink transport blocks come in parallel from each Node B involved. Based on quality estimate (QE) and CRCI information, "selective combining" takes place, comprising the selection of one transport block while rejecting all other transport blocks for the some transport channel and the same transport time interval (TTI).

A simplified FP data frame of the state of the art is shown in FIG. 4. The data frame starts with a data frame header DFH. This is followed by a number of fixed size transport format indicators TFIs for each dedicated channel DCH. Then the transport blocks TBs (hard bits) for each dedicated channel DCH follow, the size of which depends on the TFIs. Fixed size quality estimate QE information is provided before the cyclic redundancy check indicators CRCIs of each dedicated channel DCH, where the size of the cyclic redundancy check indicators CRCIs of each dedicated channel DCH also depends on the transport format indicators TFIs of the respective DCH.

In the state-of-the-art scheme, for each single transport block, the RNC receives the user data (either error-free or knowingly corrupted) and the one-bit CRCI "good" or "bad" information.

This means that, although the state of the art provides for a silent mode, which suppresses complete data frames to be transmitted on the interface when during a transmission time interval no data is available for a given transport channel, when data frames are transmitted, they are always transmitted in full length, containing even in full length those transport blocks known to be disturbed. In many cases a receiver rejects disturbed data and requests for repeated transmission. However, the unnecessary transmission of the corrupted transport blocks inevitably occupies interface resources and thus, it reduces the effective data rate of the interface between a base station and a network controller.

SUMMARY OF THE INVENTION

It is the object of the invention to provide a method for improving the interface efficiency of an interface between two network nodes.

This object is achieved by a method of transmitting a data frame via an interface between two network nodes, the data frame comprising a data frame header and at least one data block, wherein before transmission the at least one data block is checked for corruption or likely corruption, and only uncorrupted or likely uncorrupted data blocks are included in the data frame and are transmitted via the interface.

This results in less data being transmitted via the interface because the corrupted or likely corrupted data blocks are not transmitted. Hence, effective data rates and thus the efficiency of the interface are enhanced, thereby saving interface resources. The general term data block is to be understood equivalent to data record or transport block, which is often used in the context with UMTS-systems. The data frame header may comprise information about the length of the data frame in bits. With simple data frame configurations it may be derived from the length of the data frame whether certain data blocks have been suppressed or not. In UMTS systems the data frame may also comprise transport format indicators indicating the number of transport blocks in each dedicated channel (DCH). The main benefit of the inventive method lies in its application for the uplink connection between a base station and a radio network controller.

The full benefit of the inventive method may be appreciated by considering that the interface efficiency improvement is achieved by suppression of single disturbed or likely disturbed data or transport blocks inside the data or transportation frames between a base station (Node B in UMTS) and a radio network controller (RNC).

The quantitative extent of efficiency improvement achieved depends substantially on the maximal block error rate (BLER) as defined by the Quality-of-Service (QoS) requirements as defined for the separate transmission services. Typical BLER values are $10^{-2}$ for speech services and $10^{-3}$ for data services.

Substantial efficiency improvement is achieved in case the CDMA-related macrodiversity or "soft handover" state is considered. In third generation partnership project (3GPP) UMTS scenarios, typically 40% of the mobile stations are in soft handover with 2 Nodes B or more.

The BLER requirement which is relevant to the CDMA power control is derived from the total transmission link between the mobile station (e.g. a UMTS UE) and the RNC. However, when the transmission link actually comprises more than one parallel link as in the case of "soft handover", the separate BLER for each parallel link can be considerably higher than the overall BLER.

In general, $$BLER_i \geq BLER_{overall} \text{ for all } i$$

Especially, when the channel disturbation effects on each parallel link are perfectly uncorrelated, the following relationship applies:

$$BLER_{overall} = \prod_{all\ i} BLER_i$$

For instance, when a transmission link comprises two uncorrelated parallel links, an overall BLER of $10^{-2}$ can be achieved by $BLER_1=BLER_2=0.1$ (unbiased soft handover). In this case, the inventive method would save about 10% of interface data transmission.

When the soft handover is biased, meaning that one parallel link shows a clearly better throughput quality than the other link or links (which typically occurs when the mobile station is distinctly closer to one of the base stations than to the other base stations with which it is in soft handover), this will result into higher savings. For instance, an overall BLER of $10^{-3}$ could also be achieved by $BLER_1=0.002$ and $BLER_2=0.5$, and the inventive method would save about 25% of data transmission, without any quality of service (QoS) degradation.

Even higher savings can be expected from the consideration that soft handover radio links are typically added and maintained at signal to interference ratios (SIR) which can be up to 3 to 5 dB below the SIR of the best link in the soft handover set (H. Holma and A. Toskola (Editors), "WCDMA for UMTS, Radio Access for Third Generation Mobile Communications", $2^{nd}$ Edition, Wiley/Chichester, 2002, p. 232). Assuming that the uplink power control keeps the BLER of the best link at $10^{-2}$ or $10^{-3}$, other links may show long-term BLER values in the range 70% to 100% (Holma et al., FIG. 12.18 on p. 330 or FIG. 12.29 on p. 346). Then, the interface resource savings for one soft-handover uplink connection using the inventive method may reach 35%-50% for a 2-link soft handover or 47%-67% for a 3-link soft handover, again without any QoS degradation.

In a preferred variant of the inventive method a suppression indicator is generated and transmitted as part of the data frame. Such a suppression indicator may be a quality estimate QE. Both network nodes connected via the interface may be arranged such that they know that a specific data block is only transmitted within a data frame if the quality estimate value QE transmitted with the same data frame lies in a given range. For different data blocks within the same data frame different ranges may apply. The ranges may depend p. ex. on the code types and rates of the channel error protection coding used. This variant of the inventive method may find application particularly in case data blocks are not provided with CRC protection. The QE indicates the probability of a data block being corrupted.

In a preferred variant of the method, which is particularly suitable for more complex data frame configurations, a data block specific suppression indicator, in particular a one-bit suppression indicator, is generated for each data block and a data block checked for corruption or likely corruption as well as the corresponding suppression indicator are transmitted if the suppression indicator indicates an uncorrupted or likely uncorrupted data block and only the suppression indicator is transmitted if a corrupted or likely corrupted data block is indicated by the suppression indicator. For example, a cyclic redundancy check can be performed on each data block in order to decide, whether the data block is corrupted or not and thus if the data block is to be transmitted in the data frame or not. After the cyclic redundancy check an indicator for each checked data block, in particular a one-bit cyclic redundancy check indicator (CRCI), which in this case constitutes the suppression indicator, may be generated and transmitted in the data frame. If the CRCI indicates that data block is corrupted, the receiving network node knows that the corresponding data block has not been transmitted. Alternatively, if a cyclic redundancy check is not performed, a decoder specific metric may be chosen as criterion whether a data block is likely to be corrupted after decoding. If a high probability exists that a data block will be corrupted after decoding its transmission is suppressed. The suppression indicator indicates for each data block whether it is transmitted or not.

The invention further relates to a network node in a communications network for transmitting and receiving data frames, wherein the network node comprises means for detecting corrupt or likely corrupt data blocks and means for generating data frames which contain only data blocks which are uncorrupted or likely uncorrupted. Such a network node is particularly suitable for performing the inventive method and thus for improving the efficiency of the interface between two network nodes. Since only uncorrupted or likely uncorrupted data blocks are transmitted over the interface the effective data rate capacities are greatly improved.

In a preferred embodiment the network node is a base station or a radio network controller. The base station may be a base transceiver station (BTS) or a Node B in a UMTS system.

The network nodes are preferably used in a communications network for transmitting data frames between first and second network nodes over network connections, wherein the data frames comprise only uncorrupted or likely uncorrupted data blocks. This measure ensures high effective data rates.

Advantageously, the network connection is a frame protocol interface between a first network node, in particular a base station, and a second network node, in particular a radio network controller. Such an interface enables the efficient exchange of data between two network nodes and thus a good customer service without a degradation in the quality of service.

Within the scope of the invention also falls a data frame format for transmitting data frames, comprising a frame header and data blocks, between network nodes in a communications network, wherein the frame format comprises at least one suppression indicator which indicates if one or more data blocks are not transmitted. Arranging the suppression indicator(s) before the data blocks ensures that the positions of the suppression indicators in the data frame do not depend on their own values. This enables or at least facilitates their detection in the receiving network node. In particular with macro-diversity combining being used in the network node embodied as radio network controller this arrangement of the suppression indicators enables the radio network controller to detect the suppression indicators and the variable size data blocks.

For macro-diversity combining to work properly it is particularly advantageous if the suppression indicators are located at a fixed position before the transport blocks.

If the data frame format comprises a quality estimate (QE), this may also be used as suppression indicator for one or more than one data block inside the data frame. If the QE is used as suppression indicator, the data frame length varies with the QE value. Thus, in that case it is advantageous to locate the QE before the data blocks in the data frame. This enables or at least facilitates its detection in the receiving network node.

The data frame format is particularly suitable for the use in UMTS systems if the data frame comprises transport format indicators for each data channel and if the size of the data blocks of each transport channel depends on the transport format indicators and the suppression indicators of the respective data channel.

It is possible that for a given uplink connection, a requirement exists that the radio network controller shall pass on a non-empty uplink data block, even when no uncorrupted or likely uncorrupted data block arrives from the interface(s) with the base station(s). This requirement can be met easily by instructing at least one base station which serves the given connection to always transmit data blocks irrespective of the status of the suppression indicators. As both the radio network controller and the base station(s) are informed about the instruction, no further adaptation or modification of the data frame format is necessary. In fact, the suppression indicators loose their proper meaning in this case, but they still may be maintained in the data frame format for indication of corruption or likely corruption for single data blocks for the purpose of "selective combining" or uplink outer loop power control. In case of soft handover, it is advantageous to select the link with the lowest BLER as "always-transmit" link, as this principle maximizes the interface efficiency. When due to the movement of the mobile station, another link in the soft handover set becomes the best link, the radio network controller should migrate the "always-transmit" status adaptively to the new best link.

Further advantages can be extracted from the description and the enclosed drawing. The features mentioned above and below can be used in accordance with the invention either individually or collectively in any combination. The embodiments mentioned are not to be understood as exhaustive enumeration but rather have exemplary character for the description of the invention.

BRIEF DESCRIPTION OF THE DRAWINGS

The invention is shown in the drawings.
FIG. 4 shows a data frame according to the state of the art.

DETAILED DESCRIPTION OF THE INVENTION

Figure 1:
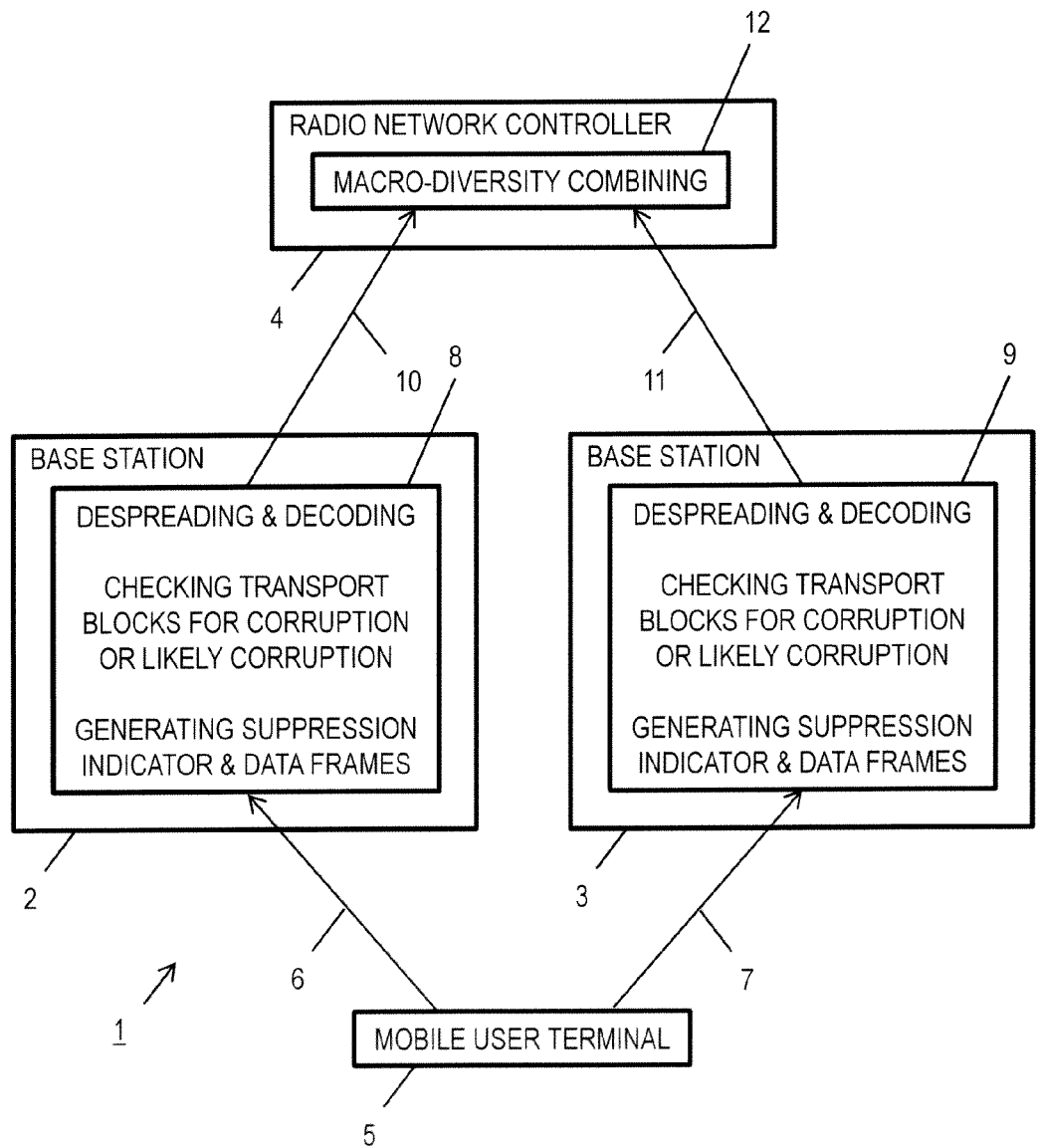
FIG. 1 shows schematically a communications network comprising two base stations and a radio network controller.

The communications network 1 of FIG. 1 comprises first network nodes 2, 3 embodied as base stations and a second network node 4 embodied as radio network controller RNC. The mobile user terminal 5 is located in the overlapping area of two cells, one related to the network node 2, the other related to the network node 3. Hence, two mobile radio links 6, 7 exist between the mobile user terminal 5 and the network nodes 2, 3. The first network nodes 2, 3 comprise means for despreading and decoding as well as means 8, 9 for checking transport blocks for corruption or likely corruption and for generating suppression indicators as well as data frames. The data frames are transmitted to and received from the second network node 4, which is connected to the first network nodes 2, 3 via fixed link network connections 10, 11. The network connections 10, 11 are the interface between the first and second network nodes 2-4. The second network node 4 comprises means 12 for macro-diversity combining. Macro-diversity combining means that several communications links are generated for each mobile user terminal 5 and managed by the second network node 4. Thus, the information received over different signal paths is combined by the second network node 4 and passed on.

Figure 2:
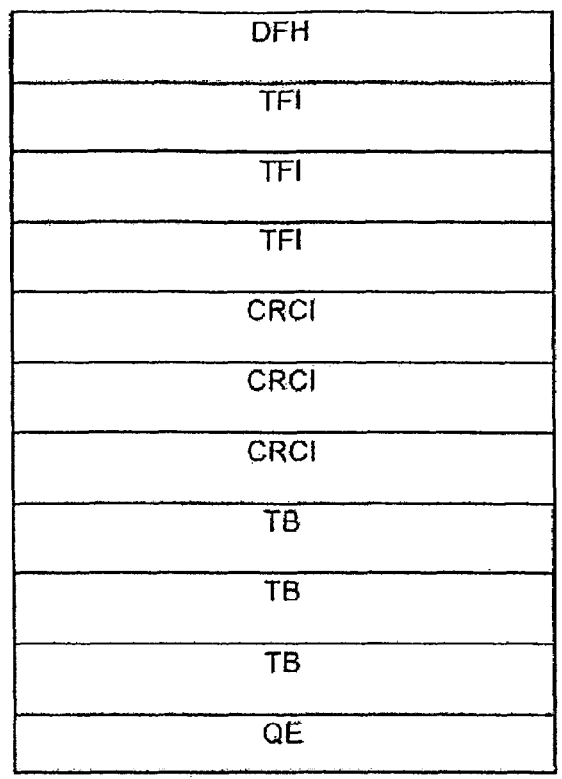
FIG. 2 shows a first example of a data frame.

FIG. 2 shows a first example of a data frame format. The data frame comprises on top a data frame header DFH. This is followed by fixed size transport format indicators TFI of each dedicated channel DCH. In the data frame shown in FIG. 2 three dedicated channels are provided. After that suppression indicators embodied as cyclic redundancy check indicators CRCI, whose length depends on the transport format indicators TFI, for each dedicated channel DCH are listed. Then the data blocks, here called transport blocks TB for each dedicated channel DCH follow. The size of the transport blocks TB depends on the transport format indicators TFI and the suppression indicators CRCI corresponding to each transport block TB. A transport block TB is only present in the data frame if the suppression indicator indicates that the transport block TB is not suppressed. If the transport block TB is suppressed, only the one-bit suppression indicator associated with this transport block TB is transmitted. The data frame ends with a fixed size quality estimate QE factor. The location of the quality estimate QE factor is arbitrary. The suppression indicator is located before the transport blocks TB, since otherwise the positions of the suppression indicators would depend on their own values. Thus, in order to enable the second network node 4 to detect the suppression indicators and the variable transport block sizes easily when applying enhanced macro-diversity combining, the suppression indicators are arranged at a position before the transport blocks TB.

Figure 3:
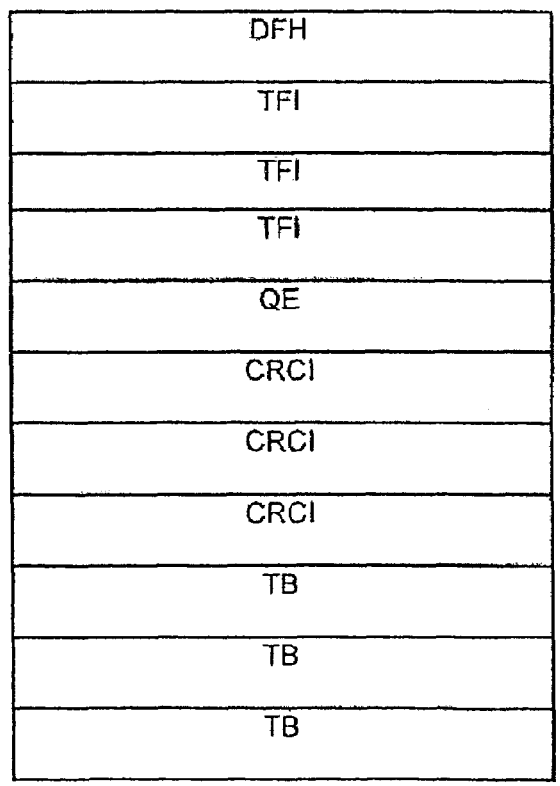
FIG. 3 shows a second example of a data frame.

FIG. 3 shows an alternative data frame format, where in contrast to the data frame format of FIG. 2 the quality estimate QE is located between the TFI section and the suppression indicator CRCI section. However, the suppression indicators are still located before the transport block TB section.

In a method for improving the interface efficiency between two network nodes (2, 3, 4) in a communications network (1) the data blocks to be transmitted over the interface are checked for corruption or likely corruption prior to transmission and only uncorrupted or likely uncorrupted data blocks are incorporated in the data frame and transmitted over the interface.

The invention claimed is:

1. A method, comprising:
transmitting a data frame via an interface between two network nodes, the data frame comprising a data frame header and multiple data blocks, said data blocks being received at a transmitting network node from a mobile station over a radio link, wherein before transmission said data blocks are checked for corruption or for a high probability of being corrupted after decoding at the transmitting network node, at least one suppression indicator being generated to indicate if data blocks are corrupted or have a high probability of being corrupted after decoding, said suppression indicator being transmitted as part of the data frame, and only uncorrupted data blocks or data blocks having a high probability of not being corrupted after decoding are included in the data frame and are transmitted via the interface.

2. Method according to claim 1, further comprising:
generating a data block specific suppression indicator for each data block;
transmitting each checked data block and the corresponding suppression indicator, if the suppression indicator indicates the corresponding data block is uncorrupted or has a high probability of not being corrupted after decoding; and
transmitting only the suppression indicator, if the suppression indicator indicates the corresponding data block is corrupted or has a high probability of being corrupted after decoding.

3. The method set forth in claim 2 wherein the data frame comprises transport format indicators for each of a plurality of dedicated channels and the size of the data blocks of each dedicated channel depends on the transport format indicators and the data block specific suppression indicators.

4. Method according to claim 1, wherein the suppression indicators are located at a position before the data blocks in said data frame.

5. Method according to claim 1, wherein the data frame comprises transport format indicators for each of a plurality of dedicated channels and wherein the size of the data blocks of each dedicated channel depends on the transport format indicators and the suppression indicators of the respective dedicated channel.

6. The method set forth in claim 1, further comprising:
generating a quality estimate indicative of a probability of the data blocks associated with the data frame being corrupted after decoding, wherein the at least one suppression indicator includes the quality estimate and indicates the data blocks either: i) have a high probability of being corrupted after decoding if a value for the quality estimate is not within a predetermined range or ii) have a high probability of not being corrupted after decoding if the value for the quality estimate is within the predetermined range.

7. The method set forth in claim 6 wherein the data frame comprises transport format indicators for each of a plurality of dedicated channels and the size of the data blocks of each dedicated channel depends on the transport format indicators and the quality estimate.

8. Network node in a communications network for transmitting data frames, wherein the network node comprises means for detecting corrupt data blocks or data blocks having a high probability of being corrupted after decoding, said data blocks being received by the network node from a mobile station over a radio link, means for generating at least one suppression indicator indicating if the data blocks are corrupted or have a high probability of being corrupted after decoding, and means for generating data frames which contain said at least one suppression indicator and only data blocks which are uncorrupted or data blocks having a high probability of not being corrupted after decoding.

9. Network node according to claim 8, wherein the network node is a base station.

10. Communications network for transmitting data frames between first and second network nodes, over a network connections, wherein the first network node is a network node according to claim 8.

11. Communications network according to claim 10, wherein the network connection is a frame protocol interface between the first network node and the second network node.

12. The communication network set forth in claim 11 wherein the first network node is a base station and the second network node is a radio network controller.

13. The network node set forth in claim 8, further including:
means for receiving the data blocks from the mobile station over a radio link; and
means for transmitting the data frames to a radio network controller via a communications network.

14. A method of transmitting a data frame via an interface between two network nodes, the method comprising:
a) receiving data blocks at a first network node from a mobile station over a radio link;
b) checking the data blocks for corruption or for a high probability of being corrupted after decoding;
c) generating at least one suppression indicator based on the checking in b) to indicate the data blocks are either i) corrupted or have an unacceptable probability of being corrupted after decoding or ii) uncorrupted or have an acceptable probability of not being corrupted after decoding;
d) generating the data frame comprising a data frame header, the at least one suppression indicator, and the data blocks that are uncorrupted or have an acceptable probability of not being corrupted after decoding based on the checking in b); and
e) transmitting the data frame from the first network node to a second network node via the interface.

15. The method set forth in claim 14, further comprising:
f) arranging the data frame with the at least one suppression indicator before the data blocks.

16. The method set forth in claim 15, further comprising:
f) generating a quality estimate indicative of a probability of the data blocks associated with the data frame being corrupted after decoding, wherein the at least one suppression indicator includes the quality estimate and indicates the data blocks either: i) have an unacceptable probability of being corrupted after decoding if a value for the quality estimate is not within a predetermined range or ii) have an acceptable probability of not being corrupted after decoding if the value for the quality estimate is within the predetermined range.

17. The method set forth in claim 16 wherein the data frame comprises transport format indicators for each of a plurality of dedicated channels and the size of the data blocks of each dedicated channel depends on the transport format indicators and the quality estimate.

18. The method set forth in claim 14, further comprising:
f) generating cyclic redundancy check indicators for each data block indicative of whether or not the corresponding data block is corrupted or uncorrupted, wherein the at least one suppression indicator includes the cyclic redundancy check indicators and indicates that each data block is either: i) corrupted or ii) uncorrupted.

19. The method set forth in claim 18 wherein the data frame comprises transport format indicators for each of a plurality of dedicated channels and the size of the data blocks of each dedicated channel depends on the transport format indicators and the cyclic redundancy check indicators.

20. The method set forth in claim 14 wherein the data frame comprises transport format indicators for each of a plurality of dedicated channels and the size of the data blocks of each dedicated channel depends on the transport format indicators and the at least one suppression indicator.

* * * * *

UNITED STATES PATENT AND TRADEMARK OFFICE
CERTIFICATE OF CORRECTION

PATENT NO.       : 7,607,054 B2  
APPLICATION NO.  : 10/863233  
DATED            : October 20, 2009  
INVENTOR(S)      : Paul A. M. Bune Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1344 days.

Signed and Sealed this

Twelfth Day of October, 2010

David J. Kappos  
*Director of the United States Patent and Trademark Office*